(12) United States Patent
Park et al.

(10) Patent No.: US 7,711,514 B2
(45) Date of Patent: May 4, 2010

(54) COMPUTER-IMPLEMENTED METHODS, CARRIER MEDIA, AND SYSTEMS FOR GENERATING A METROLOGY SAMPLING PLAN

(75) Inventors: Allen Park, San Jose, CA (US); Ellis Chang, Saratoga, CA (US)

(73) Assignee: KLA-Tencor Technologies Corp., Milpitas, CA (US)

( * ) Notice: Subject to any disclaimer, the term of this patent is extended or adjusted under 35 U.S.C. 154(b) by 12 days.

(21) Appl. No.: 11/837,208

(22) Filed: Aug. 10, 2007

(65) Prior Publication Data

US 2009/0043527 A1 Feb. 12, 2009

(51) Int. Cl.
*G01M 19/00* (2006.01)
*G06F 11/30* (2006.01)

(52) U.S. Cl. .................. 702/123; 382/145; 382/149; 702/81; 702/185

(58) Field of Classification Search .............. 702/35, 702/81–83, 150, 179, 183, 185, 123; 703/14; 382/141, 144, 145, 149, 147; 700/110, 121; 716/4, 19, 20, 21; 356/237.1, 237.2, 237.3, 356/237.5
See application file for complete search history.

(56) References Cited

U.S. PATENT DOCUMENTS

| | | |
|---|---|---|
| 3,495,269 A | 2/1970 | Mutschler et al. |
| 3,496,352 A | 2/1970 | Jugle |
| 3,909,602 A | 9/1975 | Micka |
| 4,015,203 A | 3/1977 | Verkuil |
| 4,247,203 A | 1/1981 | Levy et al. |
| 4,347,001 A | 8/1982 | Levy et al. |
| 4,378,159 A | 3/1983 | Galbraith |
| 4,448,532 A | 5/1984 | Joseph et al. |
| 4,532,650 A | 7/1985 | Wihl et al. |
| 4,555,798 A | 11/1985 | Broadbent, Jr. et al. |
| 4,578,810 A | 3/1986 | MacFarlane et al. |
| 4,579,455 A | 4/1986 | Levy et al. |
| 4,595,289 A | 6/1986 | Feldman et al. |
| 4,599,558 A | 7/1986 | Castellano et al. |

(Continued)

FOREIGN PATENT DOCUMENTS

EP 0032197 7/1981

(Continued)

OTHER PUBLICATIONS

U.S. Appl. No. 11/960,157, filed Dec. 2007, Kulkarni et al.

(Continued)

*Primary Examiner*—John H Le
(74) *Attorney, Agent, or Firm*—Ann Marie Mewherter

(57) ABSTRACT

Various computer-implemented methods, carrier media, and systems for generating a metrology sampling plan are provided. One computer-implemented method for generating a metrology sampling plan includes identifying one or more individual defects that have one or more attributes that are abnormal from one or more attributes of a population of defects in which the individual defects are included. The population of defects is located in a predetermined pattern on a wafer. The method also includes generating the metrology sampling plan based on results of the identifying step such that one or more areas on the wafer in which the one or more identified individual defects are located are sampled during metrology.

22 Claims, 2 Drawing Sheets

U.S. PATENT DOCUMENTS

| | | | |
|---|---|---|---|
| 4,633,504 A | 12/1986 | Wihl | |
| 4,641,353 A | 2/1987 | Kobayashi | |
| 4,641,967 A | 2/1987 | Pecan | |
| 4,734,721 A | 3/1988 | Boyer et al. | |
| 4,758,094 A | 7/1988 | Wihl | |
| 4,766,324 A | 8/1988 | Saadat et al. | |
| 4,799,175 A | 1/1989 | Sano et al. | |
| 4,805,123 A | 2/1989 | Specht et al. | |
| 4,812,756 A | 3/1989 | Curtis et al. | |
| 4,814,829 A | 3/1989 | Kosugi et al. | |
| 4,817,123 A | 3/1989 | Sones et al. | |
| 4,845,558 A | 7/1989 | Tsai et al. | |
| 4,877,326 A | 10/1989 | Chadwick et al. | |
| 4,926,489 A | 5/1990 | Danielson et al. | |
| 4,928,313 A | 5/1990 | Leonard et al. | |
| 5,046,109 A | 9/1991 | Fujimori et al. | |
| 5,189,481 A | 2/1993 | Jann et al. | |
| 5,444,480 A | 8/1995 | Sumita | |
| 5,453,844 A | 9/1995 | George et al. | |
| 5,459,520 A | 10/1995 | Sasaki | |
| 5,481,624 A | 1/1996 | Kamon | |
| 5,485,091 A | 1/1996 | Verkuil | |
| 5,528,153 A | 6/1996 | Taylor et al. | |
| 5,544,256 A | 8/1996 | Brecher et al. | |
| 5,563,702 A | 10/1996 | Emery et al. | |
| 5,572,598 A | 11/1996 | Wihl et al. | |
| 5,578,821 A | 11/1996 | Meisberger et al. | |
| 5,594,247 A | 1/1997 | Verkuil et al. | |
| 5,608,538 A | 3/1997 | Edger et al. | |
| 5,619,548 A | 4/1997 | Koppel | |
| 5,621,519 A | 4/1997 | Frost et al. | |
| 5,644,223 A | 7/1997 | Verkuil | |
| 5,650,731 A | 7/1997 | Fung | |
| 5,661,408 A | 8/1997 | Kamieniecki et al. | |
| 5,689,614 A | 11/1997 | Gronet et al. | |
| 5,694,478 A | 12/1997 | Braier et al. | |
| 5,696,835 A | 12/1997 | Hennessey et al. | |
| 5,703,969 A | 12/1997 | Hennessey et al. | |
| 5,737,072 A | 4/1998 | Emery et al. | |
| 5,742,658 A | 4/1998 | Tiffin et al. | |
| 5,754,678 A | 5/1998 | Hawthorne et al. | |
| 5,767,691 A | 6/1998 | Verkuil | |
| 5,767,693 A | 6/1998 | Verkuil | |
| 5,771,317 A | 6/1998 | Edgar | |
| 5,773,989 A | 6/1998 | Edelman et al. | |
| 5,774,179 A | 6/1998 | Chevrette et al. | |
| 5,795,685 A | 8/1998 | Liebmann et al. | |
| 5,834,941 A | 11/1998 | Verkuil | |
| 5,852,232 A | 12/1998 | Samsavar et al. | |
| 5,866,806 A | 2/1999 | Samsavar et al. | |
| 5,874,733 A | 2/1999 | Silver et al. | |
| 5,884,242 A | 3/1999 | Meier et al. | |
| 5,889,593 A | 3/1999 | Bareket | |
| 5,932,377 A | 8/1999 | Ferguson et al. | |
| 5,940,458 A | 8/1999 | Suk | |
| 5,948,972 A | 9/1999 | Samsavar et al. | |
| 5,955,661 A | 9/1999 | Samsavar et al. | |
| 5,965,306 A | 10/1999 | Mansfield et al. | |
| 5,980,187 A | 11/1999 | Verhovsky | |
| 5,986,263 A | 11/1999 | Hiroi et al. | |
| 5,991,699 A | 11/1999 | Kulkarni et al. | |
| 6,011,404 A | 1/2000 | Ma et al. | |
| 6,014,461 A | 1/2000 | Hennessey et al. | |
| 6,052,478 A | 4/2000 | Wihl et al. | |
| 6,060,709 A | 5/2000 | Verkuil et al. | |
| 6,072,320 A | 6/2000 | Verkuil | |
| 6,076,465 A | 6/2000 | Vacca et al. | |
| 6,078,738 A | 6/2000 | Garza et al. | |
| 6,091,257 A | 7/2000 | Verkuil et al. | |
| 6,091,846 A | 7/2000 | Lin et al. | |
| 6,097,196 A | 8/2000 | Verkuil et al. | |
| 6,097,887 A | 8/2000 | Hardikar et al. | |
| 6,104,206 A | 8/2000 | Verkuil | |
| 6,104,835 A | 8/2000 | Han | |
| 6,121,783 A | 9/2000 | Horner et al. | |
| 6,122,017 A | 9/2000 | Taubman | |
| 6,122,046 A | 9/2000 | Almogy | |
| 6,137,570 A | 10/2000 | Chuang et al. | |
| 6,141,038 A | 10/2000 | Young et al. | |
| 6,146,627 A | 11/2000 | Muller et al. | |
| 6,171,737 B1 | 1/2001 | Phan et al. | |
| 6,175,645 B1 | 1/2001 | Elyasaf et al. | |
| 6,184,929 B1 | 2/2001 | Noda et al. | |
| 6,184,976 B1 | 2/2001 | Park et al. | |
| 6,191,605 B1 | 2/2001 | Miller et al. | |
| 6,201,999 B1 | 3/2001 | Jevtic | |
| 6,202,029 B1 | 3/2001 | Verkuil et al. | |
| 6,205,239 B1 | 3/2001 | Lin et al. | |
| 6,224,638 B1 | 5/2001 | Jevtic et al. | |
| 6,233,719 B1 | 5/2001 | Hardikar et al. | |
| 6,248,485 B1 | 6/2001 | Cuthbert | |
| 6,248,486 B1 | 6/2001 | Dirksen et al. | |
| 6,259,960 B1 | 7/2001 | Inokuchi | |
| 6,266,437 B1 | 7/2001 | Elchel et al. | |
| 6,267,005 B1 | 7/2001 | Samsavar et al. | |
| 6,268,093 B1 | 7/2001 | Kenan et al. | |
| 6,272,236 B1 | 8/2001 | Pierrat et al. | |
| 6,282,309 B1 | 8/2001 | Emery | |
| 6,292,582 B1 | 9/2001 | Lin et al. | |
| 6,324,298 B1 | 11/2001 | O'Dell et al. | |
| 6,344,640 B1 | 2/2002 | Rhoads | |
| 6,363,166 B1 | 3/2002 | Wihl et al. | |
| 6,373,975 B1 | 4/2002 | Bula et al. | |
| 6,415,421 B2 | 7/2002 | Anderson et al. | |
| 6,445,199 B1 | 9/2002 | Satya et al. | |
| 6,451,690 B1 | 9/2002 | Matsumoto | |
| 6,466,314 B1 | 10/2002 | Lehman | |
| 6,466,315 B1 | 10/2002 | Karpol et al. | |
| 6,470,489 B1 | 10/2002 | Chang et al. | |
| 6,483,938 B1 | 11/2002 | Hennessey et al. | |
| 6,513,151 B1 | 1/2003 | Erhardt et al. | |
| 6,526,164 B1 | 2/2003 | Mansfield et al. | |
| 6,529,621 B1 | 3/2003 | Glasser et al. | |
| 6,535,628 B2 | 3/2003 | Smargiassi et al. | |
| 6,539,106 B1 | 3/2003 | Gallarda et al. | |
| 6,569,691 B1 | 5/2003 | Jastrzebski et al. | |
| 6,581,193 B1 | 6/2003 | McGhee et al. | |
| 6,593,748 B1 | 7/2003 | Halliyal et al. | |
| 6,597,193 B2 | 7/2003 | Lagowski et al. | |
| 6,602,728 B1 | 8/2003 | Liebmann et al. | |
| 6,608,681 B2 | 8/2003 | Tanaka et al. | |
| 6,614,520 B1 | 9/2003 | Bareket et al. | |
| 6,631,511 B2 | 10/2003 | Haffner | |
| 6,636,301 B1 | 10/2003 | Kvamme et al. | |
| 6,642,066 B1 | 11/2003 | Halliyal et al. | |
| 6,658,640 B2 | 12/2003 | Weed | |
| 6,665,065 B1 | 12/2003 | Phan et al. | |
| 6,670,082 B2 | 12/2003 | Liu et al. | |
| 6,680,621 B2 | 1/2004 | Savtchouk et al. | |
| 6,691,052 B1 | 2/2004 | Maurer | |
| 6,701,004 B1 | 3/2004 | Shykind et al. | |
| 6,718,526 B1 | 4/2004 | Eldredge et al. | |
| 6,721,695 B1 | 4/2004 | Chen et al. | |
| 6,734,696 B2 | 5/2004 | Horner et al. | |
| 6,748,103 B2 | 6/2004 | Glasser | |
| 6,751,519 B1 | 6/2004 | Satya et al. | |
| 6,753,954 B2 | 6/2004 | Chen | |
| 6,757,645 B2 | 6/2004 | Chang | |
| 6,771,806 B1 | 8/2004 | Satya et al. | |
| 6,775,818 B2 | 8/2004 | Taravade et al. | |
| 6,777,147 B1 | 8/2004 | Fonseca et al. | |
| 6,777,676 B1 | 8/2004 | Wang et al. | |
| 6,778,695 B1 | 8/2004 | Schellenberg et al. | |
| 6,779,159 B2 | 8/2004 | Yokoyama et al. | |

| | | | | | | |
|---|---|---|---|---|---|---|
| 6,784,446 B1 | 8/2004 | Phan et al. | | 2002/0164065 A1 | 11/2002 | Cai et al. |
| 6,788,400 B2 | 9/2004 | Chen | | 2002/0181756 A1 | 12/2002 | Shibuya et al. |
| 6,789,032 B2 | 9/2004 | Barbour et al. | | 2002/0186878 A1 | 12/2002 | Hoon et al. |
| 6,803,554 B2 | 10/2004 | Ye et al. | | 2002/0192578 A1 | 12/2002 | Tanaka et al. |
| 6,806,456 B1 | 10/2004 | Ye et al. | | 2003/0014146 A1 | 1/2003 | Fujii |
| 6,807,503 B2 | 10/2004 | Ye et al. | | 2003/0022401 A1 | 1/2003 | Hamamatsu et al. |
| 6,813,572 B2 | 11/2004 | Satya et al. | | 2003/0033046 A1 | 2/2003 | Yoshitake et al. |
| 6,820,028 B2 | 11/2004 | Ye et al. | | 2003/0048458 A1 | 3/2003 | Mieher |
| 6,828,542 B2 | 12/2004 | Ye et al. | | 2003/0048939 A1 | 3/2003 | Lehman |
| 6,842,225 B1 | 1/2005 | Irie | | 2003/0057971 A1 | 3/2003 | Nishiyama et al. |
| 6,859,746 B1 | 2/2005 | Stirton | | 2003/0086081 A1 | 5/2003 | Lehman |
| 6,879,924 B2 | 4/2005 | Ye et al. | | 2003/0098805 A1 | 5/2003 | Bizjak |
| 6,882,745 B2 | 4/2005 | Brankner | | 2003/0128870 A1 | 7/2003 | Pease et al. |
| 6,884,984 B2 | 4/2005 | Ye et al. | | 2003/0138138 A1 | 7/2003 | Vacca et al. |
| 6,886,153 B1 | 4/2005 | Bevis | | 2003/0138978 A1 | 7/2003 | Tanaka et al. |
| 6,892,156 B2 | 5/2005 | Ye et al. | | 2003/0169916 A1 | 9/2003 | Hayashi et al. |
| 6,902,855 B2 | 6/2005 | Peterson et al. | | 2003/0192015 A1 | 10/2003 | Liu |
| 6,906,305 B2 | 6/2005 | Pease et al. | | 2003/0207475 A1 | 11/2003 | Nakasuji et al. |
| 6,918,101 B1 | 7/2005 | Satya et al. | | 2003/0223639 A1 | 12/2003 | Shlain et al. |
| 6,948,141 B1 | 9/2005 | Satya et al. | | 2003/0226951 A1 | 12/2003 | Ye et al. |
| 6,959,255 B2 | 10/2005 | Ye et al. | | 2003/0228714 A1 | 12/2003 | Smith |
| 6,966,047 B1 | 11/2005 | Glasser | | 2003/0229410 A1 | 12/2003 | Smith |
| 6,969,837 B2 | 11/2005 | Ye et al. | | 2003/0229412 A1 | 12/2003 | White |
| 6,969,864 B2 | 11/2005 | Ye et al. | | 2003/0229868 A1 | 12/2003 | White |
| 6,983,060 B1 | 1/2006 | Martinent-Catalot et al. | | 2003/0229875 A1 | 12/2003 | Smith |
| 6,988,045 B2 | 1/2006 | Purdy | | 2003/0229880 A1 | 12/2003 | White |
| 7,003,755 B2 | 2/2006 | Pang et al. | | 2003/0229881 A1 | 12/2003 | White |
| 7,003,758 B2 | 2/2006 | Ye et al. | | 2003/0237064 A1 | 12/2003 | White et al. |
| 7,012,438 B1 | 3/2006 | Miller et al. | | 2004/0030430 A1 | 2/2004 | Matsuoka |
| 7,026,615 B2 | 4/2006 | Takane et al. | | 2004/0032908 A1 | 2/2004 | Hagai et al. |
| 7,027,143 B1 | 4/2006 | Stokowski et al. | | 2004/0052411 A1 | 3/2004 | Qian et al. |
| 7,030,966 B2 | 4/2006 | Hansen | | 2004/0057611 A1 | 3/2004 | Lee et al. |
| 7,030,997 B2 | 4/2006 | Neureuther et al. | | 2004/0091142 A1 | 5/2004 | Peterson et al. |
| 7,053,355 B2 | 5/2006 | Ye et al. | | 2004/0098216 A1 | 5/2004 | Ye et al. |
| 7,061,625 B1 | 6/2006 | Hwang | | 2004/0102934 A1 | 5/2004 | Chang |
| 7,103,484 B1 | 9/2006 | Shi et al. | | 2004/0107412 A1 | 6/2004 | Pack et al. |
| 7,106,895 B1 | 9/2006 | Goldberg et al. | | 2004/0119036 A1 | 6/2004 | Ye et al. |
| 7,107,517 B1 | 9/2006 | Suzuki et al. | | 2004/0133369 A1 | 7/2004 | Pack et al. |
| 7,107,571 B2 | 9/2006 | Chang et al. | | 2004/0174506 A1 | 9/2004 | Smith |
| 7,111,277 B2 | 9/2006 | Ye et al. | | 2004/0223639 A1 | 11/2004 | Sato |
| 7,114,145 B2 | 9/2006 | Ye et al. | | 2004/0228515 A1 | 11/2004 | Okabe et al. |
| 7,117,477 B2 | 10/2006 | Ye et al. | | 2004/0243320 A1 | 12/2004 | Chang et al. |
| 7,117,478 B2 | 10/2006 | Ye et al. | | 2005/0004774 A1 | 1/2005 | Volk et al. |
| 7,120,285 B1 | 10/2006 | Spence | | 2005/0008218 A1 | 1/2005 | O'Dell et al. |
| 7,120,895 B2 | 10/2006 | Ye et al. | | 2005/0010890 A1 | 1/2005 | Nehmadi et al. |
| 7,123,356 B1 | 10/2006 | Stokowski | | 2005/0062962 A1 | 3/2005 | Fairley |
| 7,124,386 B2 | 10/2006 | Smith | | 2005/0117796 A1 | 6/2005 | Matoui et al. |
| 7,133,548 B2 | 11/2006 | Kenan et al. | | 2005/0132306 A1 | 6/2005 | Smith |
| 7,135,344 B2 | 11/2006 | Nehmadi | | 2005/0141764 A1 | 6/2005 | Tohyama et al. |
| 7,136,143 B2 | 11/2006 | Smith | | 2005/0166174 A1 | 7/2005 | Ye et al. |
| 7,152,215 B2 | 12/2006 | Smith | | 2005/0190957 A1 | 9/2005 | Cai et al. |
| 7,171,334 B2 | 1/2007 | Gassner | | 2005/0198602 A1 | 9/2005 | Brankner |
| 7,174,520 B2 | 2/2007 | White | | 2006/0000964 A1 | 1/2006 | Ye et al. |
| 7,194,709 B2 | 3/2007 | Brankner | | 2006/0048089 A1 | 3/2006 | Schwarzband |
| 7,207,017 B1 | 4/2007 | Tabery et al. | | 2006/0051682 A1 | 3/2006 | Hess et al. |
| 7,231,628 B2 | 6/2007 | Pack et al. | | 2006/0062445 A1 | 3/2006 | Verma et al. |
| 7,236,847 B2 | 6/2007 | Marella | | 2006/0082763 A1 | 4/2006 | The et al. |
| 7,379,175 B1 | 5/2008 | Stokowski et al. | | 2006/0159333 A1 | 7/2006 | Ishikawa |
| 7,386,839 B1 | 6/2008 | Golender et al. | | 2006/0161452 A1 | 7/2006 | Hess et al. |
| 7,418,124 B2 | 8/2008 | Peterson et al. | | 2006/0193506 A1 | 8/2006 | Dorphan et al. |
| 7,424,145 B2 | 9/2008 | Horie et al. | | 2006/0193507 A1 | 8/2006 | Sali et al. |
| 2001/0019625 A1 | 9/2001 | Kenan et al. | | 2006/0236294 A1 | 10/2006 | Saidin |
| 2001/0022858 A1 | 9/2001 | Komiya et al. | | 2006/0236297 A1 | 10/2006 | Melvin et al. |
| 2001/0043735 A1 | 11/2001 | Smargiassi et al. | | 2006/0265145 A1 | 11/2006 | Huet et al. |
| 2002/0019729 A1 | 2/2002 | Chang et al. | | 2006/0269120 A1 | 11/2006 | Nehmadi et al. |
| 2002/0026626 A1 | 2/2002 | Randall et al. | | 2006/0273242 A1 | 12/2006 | Hunsche et al. |
| 2002/0033449 A1 | 3/2002 | Nakasuji et al. | | 2006/0273266 A1 | 12/2006 | Preil et al. |
| 2002/0035461 A1 | 3/2002 | Chang et al. | | 2006/0291714 A1 | 12/2006 | Wu et al. |
| 2002/0035641 A1 | 3/2002 | Kurose | | 2006/0292463 A1 | 12/2006 | Best et al. |
| 2002/0088951 A1 | 7/2002 | Chen | | 2007/0002322 A1 | 1/2007 | Borodovsky et al. |
| 2002/0090746 A1 | 7/2002 | Xu et al. | | 2007/0019171 A1 | 1/2007 | Smith |
| 2002/0134936 A1 | 9/2002 | Matsui et al. | | 2007/0031745 A1 | 2/2007 | Ye et al. |
| 2002/0144230 A1 | 10/2002 | Rittman | | 2007/0032896 A1 | 2/2007 | Ye et al. |

| | | | |
|---|---|---|---|
| 2007/0035322 | A1 | 2/2007 | Kang et al. |
| 2007/0035712 | A1 | 2/2007 | Gassner et al. |
| 2007/0035728 | A1 | 2/2007 | Kekare et al. |
| 2007/0052963 | A1 | 3/2007 | Orbon |
| 2007/0064995 | A1 | 3/2007 | Oaki et al. |
| 2007/0230770 | A1* | 10/2007 | Kulkarni et al. ............ 382/149 |
| 2007/0248257 | A1 | 10/2007 | Bruce et al. |
| 2008/0049994 | A1 | 2/2008 | Rognin et al. |

FOREIGN PATENT DOCUMENTS

| | | |
|---|---|---|
| EP | 0370322 | 5/1990 |
| EP | 1061358 | 12/2000 |
| EP | 1061571 | 12/2000 |
| EP | 1065567 | 1/2001 |
| EP | 1066925 | 1/2001 |
| EP | 1069609 | 1/2001 |
| EP | 1093017 | 4/2001 |
| EP | 1480034 | 11/2004 |
| EP | 1696270 | 8/2006 |
| JP | 2002-071575 | 3/2002 |
| KR | 1020030055848 | 7/2003 |
| WO | WO 98/57358 | 12/1998 |
| WO | WO 99/22310 | 5/1999 |
| WO | WO 99/25004 | 5/1999 |
| WO | WO 99/38002 | 7/1999 |
| WO | WO 99/41434 | 8/1999 |
| WO | WO 99/59200 | 11/1999 |
| WO | WO 00/03234 | 1/2000 |
| WO | WO 00/36525 | 6/2000 |
| WO | WO 00/55799 | 9/2000 |
| WO | WO 00/68884 | 11/2000 |
| WO | WO 00/70332 | 11/2000 |
| WO | WO 01/09566 | 2/2001 |
| WO | WO 01/40145 | 6/2001 |
| WO | WO 03/104921 | 12/2003 |
| WO | WO 2004/027684 | 4/2004 |
| WO | WO 2006/063268 | 6/2006 |

OTHER PUBLICATIONS

U.S. Appl. No. 11/970,294, filed Jan. 2008, Park et al.
Lorusso et al. "Advanced DFM Applns. Using design-based metrology on CDSEM," SPIE vol. 6152, Mar. 27, 2006.
Svidenko et al. "Dynamic Defect-Limited Yield Prediction by Criticality Factor," ISSM Paper: YE-O-157, 2007.
U.S. Appl. No. 11/830,485, filed Jul. 2007, Kulkarni et al.
U.S. Appl. No. 11/950,961, filed Dec. 2007, Fouquet et al.
U.S. Appl. No. 12/102,343, filed Apr. 2008, Chen et al.
U.S. Appl. No. 60/418,994, filed Oct. 15, 2002, Stokowski.
U.S. Appl. No. 60/451,707, filed Mar. 4, 2003, Howard.
U.S. Appl. No. 60/609,670, filed Sep. 14, 2004, Preil.
U.S. Appl. No. 60/738,290, filed Nov. 18, 2005, Kulkarni.
U.S. Appl. No. 60/772,418, filed Feb. 9, 2006, Kirk et al.
U.S. Appl. No. 11/673,150, filed Sep. 20, 2007, Kirk et al.
U.S. Appl. No. 10/679,617, filed Oct. 6, 2003, Stokowski.
U.S. Appl. No. 10/778,752, filed Feb. 13, 2004, Mack.
U.S. Appl. No. 10/793,599, filed Mar. 4, 2004, Howard.
U.S. Appl. No. 11/300,172, filed Dec. 14, 2005, Lin.
U.S. Appl. No. 11/154,310, filed Jun. 16, 2005, Verma et al.
U.S. Appl. No. 11/561,659, filed Nov. 20, 2006, Zafar et al.
U.S. Appl. No. 11/759,607, filed Jun. 7, 2007, Kulkarni et al.
Volk et al., "Investigation of Smart Inspection of Critical Layer Reticles using Additional Designer Data to Determine Defect Significance," Proceedings of SPIE vol. 5256, 2003, pp. 489-499.
Mack, "Lithographic Simulation: A Review," Proceedings of SPIE vol. 4440, 2001, pp. 59-72.
Lo et al., "Identifying Process Window Marginalities of Reticle Designs for 0.15/0.13 μm Technologies," Proceedings of SPIE vol. 5130, 2003, pp. 829-837.
Dirksen at al., "Impact of high order aberrations on the performance of the aberration monitor," Proc. Of SPIE vol. 4000, Mar. 2000, pp. 9-17.
Dirksen et al., "Novel aberration monitor for optical lithography," Proc. Of SPIE vol. 3679, Jul. 1999, pp. 77-86.
Allan et al., "Critical Area Extraction for Soft Fault Estimation," IEEE Transactions on Semiconductor Manufacturing, vol. 11, No. 1, Feb. 1998.
International Search Report and Written Opinion for PCT/US2008/073706 mailed Jan. 29, 2009.
International Search Report and Written Opinion for PCT/US2008/072636 mailed Jan. 29, 2009.
Barty et al., "Aerial Image Microscopes for the inspection of defects in EUV masks," Proceedings of SPIE, vol. 4889, 2002, pp. 1073-1084.
Budd et al.,"A New Mask Evaluation Tool, the Microlithography Simulation Microscope Aerial Image Measurement System," SPIE vol. 2197, 1994, pp. 530-540.
Cai at al., "Enhanced Dispositioning of Reticle Defects Using the Virtual Stepper With Automoated Defect Severity Scoring," Proceedings of the SPIE, vol. 4409, Jan. 2001, pp. 467-478.
Comizzoli, "Uses of Corono Discharges in the Semiconfuctor Industry," J. Electrochem. Soc., 1987, pp. 424-429.
Contactless Electrical Equivalent Oxide Thickness Measurement, IBM Technical Disclosure Bulletin, vol. 29, No. 10, 1987, pp. 4622-4623.
Contactless Photovoltage vs. Bias Method for Determining Flat-Band Voltage, IBM Technical Disclosure Bulletin, vol. 32, vol. 9A, 1990, pp. 14-17.
Cosway et al., "Manufacturing Implementation of Corona Oxide Silicon (COS) Systems for Diffusion Furnace Contamination Monitoring," 1997 IEEE/SEMI Advanced Semiconductor Manufacturing Conference, pp. 98-102.
Diebold et al., "Characterization and produiction metrology of thin transistor gate oxide films," Materials in Science in Semiconductor Processing 2, 1999, pp. 103-147.
Garcia et al., "New Die to Database Inspection Algorithm for Inspection of 90-nm Node Reticles," Proceedings of SPIE, vol. 5130, 2003, pp. 364-374.
Granik et al., "Sub-resolution process windows and yield estimation technique based on detailed full-chip CD simulation," Mentor Graphics, Sep. 2000, 5 pages.
Hess et al., "A Novel Approach: High Resolution Inspection with Wafer Plane Defect Detection," Proceedings of SPIE—International Society for Optical Engineering; Photomask and Next-Generation Lithography Mask Technology 2008, vol. 7028, 2008.
Huang et al., "Process Window Impact of Progressive Mask Defects, Its Inspection and Disposition Techniques (go/no-go criteria) Via a Lithographic Detector," Proceedings of SPIE—The International Society for Optical Engineering; 25th Annual Bacus Symposium on Photomask Technology 2005, vol. 5992, No. 1, 2005, p. 6.
Hung et al., Metrology Study of Sub 20 Angstrom oxynitride by Corona-Oxide-Silicon (COS) and Conventional C-V Approaches, 2002, Mat. Res. Soc. Symp. Proc., vol. 716, pp. 119-124.
International Search Report and Written Opinion for PCT Appln. No. PCT/US06/61112 dated Sep. 25, 2008.
International Search Report and Written Opinion for PCT Appln. No. PCT/US06/61113 dated Jul. 16, 2008.
International Search Report and Written Opinion for PCT Appln. No. PCT/US08/050397 dated Jul. 11, 2008.
International Search Report and Written Opinion for PCT/US2008/062873 mailed Aug. 12, 2008.
International Search Report for PCT/US2008/62875 mailed Sep. 10, 2008.
International Search Report and Written Opinion for PCT Appln. No. PCT/US2008/063008 dated Aug. 18, 2008.
International Search Report for PCT/US2003/21907 mailed Jun. 7, 2004.
International Search Report for PCT/US2004/040733 mailed Dec. 23, 2005.
Karklin et al., "Automatic Defect Severity Scoring for 193 nm Reticle Defect Inspection," Proceedings of SPIE—The International Society for Optical Engineering, 2001, vol. 4346, No. 2, pp. 898-906.
Lu et al., "Application of Simulation Based Defect Printability Analysis for Mask Qualification Control," Proceedings of SPIE, vol. 5038, 2003, pp. 33-40.

Martino et al., "Application of the Aerial Image Measurement System (AIMS(TM)) to the Analysis of Binary Mask Imaging and Resolution Enhancement Techniques," SPIE vol. 2197, 1994, pp. 573-584.

Miller, "A New Approach for Measuring Oxide Thickness," Semiconductor International, Jul. 1995, pp. 147-148.

Nagpal et al., "Wafer Plane Inspection for Advanced Reticle Defects," Proceedings of SPIE—The International Society for Optical Engineering; Photomask and Next-Generation Lithography Mask Technology. vol. 7028, 2008.

Numerical Recipes in C. The Art of Scientific Computing, 2nd Ed.,© Cambridge University Press 1988, 1992, p. 683.

Otsu, "A Threshold Selection Method from Gray-Level Histograms," IEEE Transactions on Systems, Man, and Cybernetics, vol. SMC-9, No. 1, Jan. 1979, pp. 62-66.

Pang et al., "Simulation-based Defect Printability Analysis on Alternating Phase Shifting Masks for 193 nm Lithography," Proceedings of SPIE, vol. 4889, 2002, pp. 947-954.

Pettibone et al., "Wafer Printability Simulation Accuracy Based on UV Optical Inspection Images of Reticle Defects," Proceedings of SPIE—The International Society for Optical Engineering 1999 Society of Photo-Optical Instrumentation Engineers, vol. 3677, No. II, 1999, pp. 711-720.

Phan et al., "Comparison of Binary Mask Defect Printability Analysis Using Virtual Stepper System and Aerial Image Microscope System," Proceedings of SPIE—The International Society for Optical Engineering 1999 Society of Photo-Optical Instrumentation Engineers, vol. 3873, 1999, pp. 681-692.

Sahouria et al., "Full-chip Process Simulation for Silicon DRC," Mentor Graphics, Mar. 2000, 6 pages.

Schroder et al., Corono-Oxide-Semiconductor Device Characterization, 1998, Solid-State Electronics, vol. 42, No. 4, pp. 505-512.

Schroder, "Surface voltage and surface photovoltage: history, theory and applications," Measurement Science and Technology, vol. 12, 2001, pp. R16-R31.

Schroder, Contactless Surface Charge Semiconductor Characterization, Apr. 2002, Materials Science and Engineering B, vol. 91-92, pp. 196-228.

Schurz et al., "Simulation Study of Reticle Enhancement Technology Applications for 157 nm Lithography," SPIE vol. 4562, 2002, pp. 902-913.

U.S. Appl. No. 10/677,445 (Horner et al.) entitled Methods for Non-Contacting Differential Voltage Measurements filed on Oct. 2, 2003.

U.S. Appl. No. 11/139,151 (Volk et al.) entitled Methods and Systems for Detecting Changes in Reticle Defectivity Over Time filed on May 27, 2005.

U.S. Appl. No. 12/115,833 (Alles et al.) entitled Methods for Detecting and Classifying Defects on a Reticle filed on May 6, 2008.

U.S. Appl. No. 12/116,664 (Peterson et al.) entitled Methods and Systems for Detecting Defects in a Reticle Design Pattern filed on May 7, 2008.

U.S. Appl. No. 12/195,024 (Florence et al.) entitled Computer-Implemented Methods for Determining If Actual Defects are Potentially Systematic Defects or Potentially Random Defects filed on Aug. 20, 2008.

U.S. Appl. No. 12/115,830 (Su et al.) entitled Computer-Implemented Methods, Systems, and Computer-Readable Media for Determining a Model for Predicting Printability of Reticle Features on a Wafer filed on May 6, 2008.

U.S. Appl. No. 12/115,833 (Alles et al.) entitled Methods for Detecting and Classifying Defects on a Reticle filed on May 6, 2008.

U.S. Appl. No. 12/176,095 (Bhaskar et al.) entitled Methods for Generating a Standard Reference Die for Use in a Die to Standard Reference Die Inspection and Methods for Inspecting a Wafer filed on Jul. 18, 2008.

U.S. Appl. No. 60/418,887 (Su et al.) entitled Methods and Systems for Inspecting Reticles Using Aerial Imaging and Die-to-Database Detection filed on Oct. 15, 2002.

U.S. Appl. No. 60/419,028 (Stokowski et al.) entitled Methods and Systems for Inspecting Reticles Using Aerial Imaging at Off-Stepper Wavelengths filed on Oct. 15, 2002.

U.S. Appl. No. 60/485,233 (Peterson et al.) entitled Qualifying Patterns, Patterning Processes, or Patterning Apparatus in the Fabrication of Microlithographic Patterns filed on Jul. 7, 2003.

U.S. Appl. No. 60/526,881 (Hess et al.) entitled Designer Intent filed on Dec. 4, 2003.

U.S. Appl. No. 60/681,095 (Nehmadi et al.) entitled Methods in Mask and Process Qualification filed on May 13, 2005.

U.S. Appl. No. 60/684,360 (Nehmadi et al.) entitled Design-Based Inspection filed on May 24, 2005.

Verkuil et al., "A Contactless Alternative to MOS Charge Measurements by Means of a Corona-Oxide-Semiconductor (COS) Technique,"Electrochem. Soc. Extended Abstract, 1988, vol. 88-1, No. 169, pp. 261-262.

Verkuil, "Rapid Contactless Method for Measuring Fixed Oxide Charge ASsociated with SIlicon Processing," IBM Technical Disclousre Bulletin, vol. 24, No. 6, 1981, pp. 3048-3053.

Volk et al. "Investigation of Reticle Defect Formation at DUV Lithography," 2002, BACUS Symposium on Photomask Technology.

Volk et al. "Investigation of Reticle Defect Formation at DUV Lithography," 2003, IEEE/SEMI Advanced Manufacturing Conference, pp. 29-35.

Weinberg, "Tunneling of Electrons from Si into Thermally Grown SiO2," Solid-State Electronics, 1977, vol. 20, pp. 11-18.

Weinzierl et al., "Non-Contact Corona-Based Process Control Measurements: Where We've Been, Where We're Headed," Electrochemical Society Proceedings, Oct. 1999, vol. 99-16, pp. 342-350.

Yan et al., "Printability of Pellicle Defects in DUV 0.5 um Lithography," SPIE vol. 1604, 1991, pp. 106-117.

International Search Report & Written Opinion, PCT/US2008/066328, mailed Oct. 1, 2009.

O'Gorman et al., "Subpixel Registration Using a Concentric Ring Fiducial," Proceedings of the International Conference on Pattern Recognition, vol. ii, Jun. 16, 1990, pp. 249-253.

* cited by examiner

COMPUTER-IMPLEMENTED METHODS, CARRIER MEDIA, AND SYSTEMS FOR GENERATING A METROLOGY SAMPLING PLAN

BACKGROUND OF THE INVENTION

1. Field of the Invention

The present invention generally relates to computer-implemented methods, carrier media, and systems for generating a metrology sampling plan. Certain embodiments relate to a computer-implemented method that includes generating a metrology sampling plan such that one or more areas on a wafer in which one or more individual defects, included in a population of defects located in a predetermined pattern on the wafer and having one or more abnormal attributes, are located are sampled during metrology.

2. Description of the Related Art

The following description and examples are not admitted to be prior art by virtue of their inclusion in this section.

Fabricating semiconductor devices such as logic and memory devices typically includes processing a substrate such as a semiconductor wafer using a large number of semiconductor fabrication processes to form various features and multiple levels of the semiconductor devices. For example, lithography is a semiconductor fabrication process that involves transferring a pattern from a reticle to a resist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer and then separated into individual semiconductor devices.

Inspection processes are used at various steps during a semiconductor manufacturing process to detect defects on wafers to promote higher yield in the manufacturing process and thus higher profits. Inspection has always been an important part of fabricating semiconductor devices. However, as the dimensions of semiconductor devices decrease, inspection becomes even more important to the successful manufacture of acceptable semiconductor devices because smaller defects can cause the devices to fail. For instance, as the dimensions of semiconductor devices decrease, detection of defects of decreasing size has become necessary since even relatively small defects may cause unwanted aberrations in the semiconductor devices.

Another important part of manufacturing yield control is determining the cause of defects on the wafer such that the cause of the defects can be corrected to thereby reduce the number of defects on other wafers. Often, determining the cause of defects involves identifying the defect type and other attributes of the defects such as size, shape, composition, etc. Since inspection typically only involves detecting defects on the wafer and providing limited information about the defects such as location on the wafer, number of defects on the wafer, and sometimes defect size, metrology is often used to determine more information about individual defects than that which can be determined from inspection results. For instance, a metrology tool may be used to revisit defects detected on a wafer and to examine the defects further in some manner either automatically or manually.

Metrology processes are also used at various steps during a semiconductor manufacturing process to monitor and control the process. Metrology processes are different than inspection processes in that, unlike inspection processes in which defects are detected on a wafer, metrology processes are used to measure one or more characteristics of the wafer that cannot be determined from currently used inspection tools. For example, metrology processes are used to measure one or more characteristics of a wafer such as a dimension (e.g., line width, thickness, etc.) of features formed on the wafer during a process such that the performance of the process can be determined from the one or more characteristics. In addition, if the one or more characteristics of the wafer are unacceptable (e.g., out of a predetermined range for the characteristic (s)), the measurements of the one or more characteristics of the wafer may be used to alter one or more parameters of the process such that additional wafers manufactured by the process have acceptable characteristic(s).

There are, however, a number of disadvantages to using metrology processes and tools to measure one or more characteristics of a wafer for process monitoring and control applications. For example, most metrology tools are relatively slow, particularly compared to inspection systems. Therefore, metrology processes are often performed at one location or a limited number of locations on the wafer such that metrology results may be acquired in a relatively expedient manner. However, many processes used to manufacture semiconductor devices produce wafers that have characteristic(s) that vary across the surface of the wafers. As such, using metrology measurements performed at one location or a limited number of locations on a wafer may not provide sufficient information about the characteristic(s) of the wafers such that the process can be accurately monitored and controlled. Therefore, the sampling plan of the metrology process can significantly affect the meaningfulness and usefulness of the metrology results.

There are, however, a number of disadvantages to currently used metrology sampling plans. For instance, traditional metrology sampling approaches are based on fixed locations on the wafer, which may represent samples across the wafer or may be based on previously known problem areas on the wafer. Measurements may then be performed on given sites until the fixed sample plan is adjusted (e.g., manually). Therefore, one of the disadvantages of currently used metrology sampling plans is that the fixed sites that are sampled during metrology may not be sensitive to subtle variations in the process. For example, in the event that critical dimension (CD) varies in the areas on the wafer that the fixed sampling does not cover, an important excursion may be missed, which may be particularly critical for process development at technology nodes at 65 nm and beyond.

Accordingly, it may be advantageous to develop computer-implemented methods, carrier media, and systems for generating a metrology sampling plan that is more sensitive to subtle variations in a process performed on a wafer such that important excursions in the process do not go undetected.

SUMMARY OF THE INVENTION

The following description of various embodiments of methods, carrier media, and systems is not to be construed in any way as limiting the subject matter of the appended claims.

One embodiment relates to a computer-implemented method for generating a metrology sampling plan. The method includes identifying one or more individual defects that have one or more attributes that are abnormal from one or more attributes of a population of defects in which the individual defects are included. The population of defects is located in a predetermined pattern on a wafer. The method also includes generating the metrology sampling plan based on results of the identifying step such that one or more areas on the wafer in which the one or more identified individual defects are located are sampled during metrology.

In one embodiment, the method includes determining the one or more attributes of the individual defects based on results of inspection of the wafer. In another embodiment, the method includes determining the one or more attributes of the population of defects based on the one or more attributes of the individual defects included in the population of defects.

In one embodiment, the predetermined pattern in which the population of defects is located is formed at multiple locations on the wafer. In another embodiment, the predetermined pattern includes only a portion of an entire design patterned on the wafer. In an additional embodiment, the predetermined pattern includes a pattern of interest. In a further embodiment, the predetermined pattern includes a pattern that is more sensitive to process variations than another pattern on the wafer.

In one embodiment, the method includes identifying the predetermined pattern using design data for the wafer. In another embodiment, the method includes identifying the predetermined pattern by binning defects detected on the wafer in groups such that portions of design data proximate positions of the defects in each of the groups are at least similar.

In one embodiment, the method includes identifying the population of defects by overlaying results of inspection of the wafer with locations of the predetermined pattern on the wafer. In another embodiment, the method includes identifying the population of defects by comparing locations of defects detected on the wafer to locations of the predetermined pattern on the wafer. In an additional embodiment, the method includes identifying the population of defects by comparing patterns proximate defects detected on the wafer to one or more patterns stored in a data structure.

In one embodiment, identifying the one or more individual defects includes statistical analysis of the one or more attributes of the population of defects. In another embodiment, identifying the one or more individual defects includes statistical analysis of images of the individual defects. In an additional embodiment, the one or more identified individual defects include fewer than all of the individual defects included in the population of defects. In a further embodiment, the results of identifying the one or more individual defects include the one or more individual defects located in the one or more areas on the wafer at which the predetermined pattern is more sensitive to process variations than other areas on the wafer at which the predetermined pattern is formed.

In one embodiment, the method includes performing the method separately for different predetermined patterns on the wafer such that different metrology sampling plans are generated for the different predetermined patterns. In another embodiment, generating the metrology sampling plan is performed dynamically. In an additional embodiment, generating the metrology sampling plan is performed on a wafer-to-wafer basis.

In one embodiment, the defects include pattern defects. In another embodiment, the metrology includes critical dimension metrology.

Each of the steps of the method described above may be further performed as described further herein. In addition, each of the embodiments of the method described above may include any other step(s) of any other method(s) described herein. Furthermore, each of the embodiments of the method described above may be performed by any of the systems described herein.

Another embodiment relates to a carrier medium that includes program instructions executable on a computer system for performing a computer-implemented method for generating a metrology sampling plan. The computer-implemented method includes identifying one or more individual defects that have one or more attributes that are abnormal from one or more attributes of a population of defects in which the individual defects are included. The population of defects is located in a predetermined pattern on a wafer. The computer-implemented method also includes generating the metrology sampling plan based on results of the identifying step such that one or more areas on the wafer in which the one or more identified individual defects are located are sampled during metrology.

The carrier medium described above may be further configured as described herein. The steps of the computer-implemented method may be performed as described further herein. In addition, the computer-implemented method for which the program instructions are executable may include any other step(s) of any other method(s) described herein.

An additional embodiment relates to a system configured to generate a metrology sampling plan. The system includes an inspection system configured to detect defects on a wafer. The system also includes a computer system configured to identify one or more individual defects that have one or more attributes that are abnormal from one or more attributes of a population of defects in which the individual defects are included. The population of defects is located in a predetermined pattern on the wafer. The computer system is also configured to generate the metrology sampling plan based on the one or more identified individual defects such that one or more areas on the wafer in which the one or more identified individual defects are located are sampled during metrology. The system may be further configured according to any embodiment(s) described herein.

BRIEF DESCRIPTION OF THE DRAWINGS

Further advantages of the present invention may become apparent to those skilled in the art with the benefit of the following detailed description of the preferred embodiments and upon reference to the accompanying drawings in which.

Figure 1:
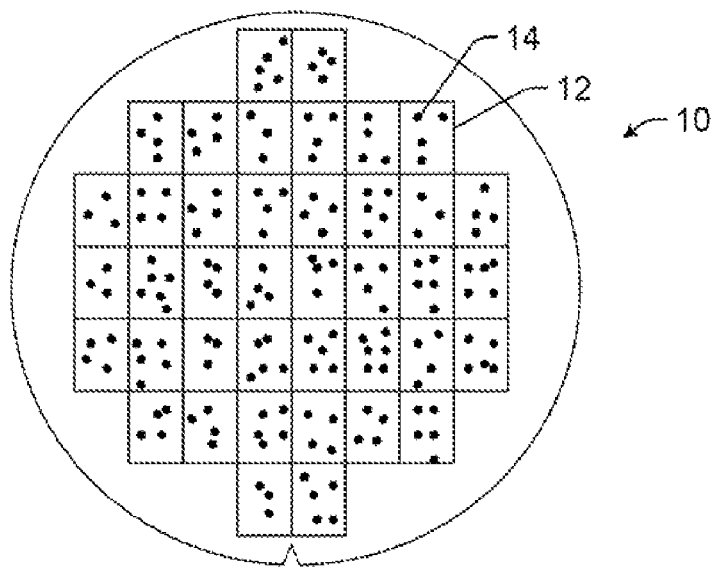
FIG. 1 is a schematic diagram illustrating one example of results of inspection of a wafer that may be used by embodiments described herein.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

As used herein, the term "wafer" generally refers to substrates formed of a semiconductor or non-semiconductor material. Examples of such a semiconductor or non-semiconductor material include, but are not limited to, monocrystalline silicon, gallium arsenide, and indium phosphide. Such substrates may be commonly found and/or processed in semiconductor fabrication facilities.

A wafer may include one or more layers formed upon a substrate. For example, such layers may include, but are not limited to, a resist, a dielectric material, a conductive material, and a semiconductive material. Many different types of such layers are known in the art, and the term wafer as used herein is intended to encompass a wafer including all types of such layers.

One or more layers formed on a wafer may be patterned or unpatterned. For example, a wafer may include a plurality of dies, each having repeatable patterned features. Formation and processing of such layers of material may ultimately result in completed devices. Many different types of devices such as integrated circuits (ICs) may be formed on a wafer, and the term wafer as used herein is intended to encompass a wafer on which any type of device known in the art is being fabricated.

Although embodiments are described herein with respect to wafers, it is to be understood that the embodiments may be used for another specimen such as a reticle, which may also be commonly referred to as a mask or a photomask. Many different types of reticles are known in the art, and the terms "reticle," "mask," and "photomask" as used herein are intended to encompass all types of reticles known in the art.

The term "design data" as used herein generally refers to the physical design (layout) of an IC and data derived from the physical design through complex simulation or simple geometric and Boolean operations. In addition, an image of a reticle acquired by a reticle inspection system and/or derivatives thereof can be used as a "proxy" or "proxies" for the design data. Such a reticle image or a derivative thereof can serve as a substitute for the design layout in any embodiments described herein that use design data. The design data may include any other design data or design data proxies described in commonly owned U.S. patent application Ser. No. 11/561,735. by Kulkarni et al. and Ser. No. 11/561,659. by Zafar et al., both of which were filed on Nov. 20, 2006, and both of which are incorporated by reference as if fully set forth herein.

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals.

In general, the embodiments described herein include generating a metrology sampling plan. One embodiment relates to a computer-implemented method for generating a metrology sampling plan. As described further herein, the method may be used to dynamically identify critical dimension (CD) sampling sites at which relatively small CD variations within die and/or wafer that may result from process variations may not be detected otherwise by fixed sampling plans. In addition, as described further herein, the methods may be used for dynamic CD measurements based on design-aware inspection output.

In one embodiment, defects detected on the wafer include pattern defects. The pattern defects may include systematic defects. Pattern or systematic defects may be identified and separated from other defects detected on the wafer (e.g., random defects and/or nuisance defects) as described in the patent applications by Kulkarni et al. and Zafar et al., which are incorporated by reference above. However, the defects may include any other defects known in the art (e.g., random defects). In addition, the defects may include all of the defects detected on the wafer, which may include different types of defects (e.g., systematic defects and random defects), and which will vary depending on the results of the inspection of the wafer.

The method may include detecting the defects on the wafer. For example, the method may include performing defect inspection using sample wafers. In this manner, the method may include generating results of inspection of the wafer by performing inspection of the wafer (e.g., by performing one or more scans of the wafer using an inspection system described herein or another suitable inspection system). However, the embodiments described herein may not include performing inspection of the wafer. For example, the embodiments described herein may include acquiring the results of inspection of the wafer from an inspection system that performed the inspection or from a storage medium (e.g., a storage medium of the inspection system, a fab database, etc.) in which the inspection system stored the results of the inspection of the wafer.

The method includes identifying one or more individual defects that have one or more attributes that are abnormal from one or more attributes of a population of defects in which the individual defects are included. The population of defects is located in a predetermined pattern on a wafer. In one embodiment, the predetermined pattern in which the population of defects is located is formed at multiple locations on the wafer. In another embodiment, the predetermined pattern includes only a portion of an entire design patterned on the wafer. For example, a die formed on the wafer may include a number of different patterns, and the predetermined pattern may include one specific pattern that forms only a portion of a die formed on the wafer. Therefore, the predetermined pattern may be formed in each die formed on the wafer. In this manner, at least one instance of the predetermined pattern may be formed in each die on the wafer. In addition, each die may include more than one instance of the predetermined pattern (e.g., depending on the repetition of the predetermined pattern in the die). Therefore, the predetermined pattern may be formed at multiple instances in a die and in more than one die formed on the wafer.

The predetermined pattern may also include a pattern of interest (POI). The POI may be selected by a user in any suitable manner (e.g., manually by selecting a pattern that the user cares about). In some embodiments, the method includes identifying the POI. For example, the POI may be selected by the embodiments described herein (e.g., automatically or without any input from the user). The POI may be identified based on data from electronic design automation (EDA) tools, design based binning (DBB), which may be performed as described herein by an inspection system such as a bright field (BF) inspection system configured to perform such binning, and other knowledge. For example, information about the design for the wafer such as the critical path information may be generated by an EDA tool. In one such example, the critical path information may be available from EDA tools such as Blaze MO™ Optimization Software commercially available from Blaze DFM, Inc., Sunnyvale, Calif., and tools commercially available from Cadence Design Systems, Inc., San Jose, Calif. Any such information about the design generated by an EDA tool may be used to identify a POI. For example, the POI may be selected as a pattern that forms part of a critical path or is located at or near a critical path on the same layer as the POI or on another layer of the wafer. In addition, the design data may be searched for one or more POIs in any suitable manner. For example, searching the design data for one or more POIs may be performed as described in the above-reference patent applications by Kulkarni et al. and Zafar et al. In addition, the POI(s) may be selected or identified using any other method or system described in these patent applications.

In one embodiment, the predetermined pattern includes a pattern that is more sensitive to process variations than another pattern on the wafer. The method may include identifying the pattern that is relatively sensitive to process variations. Such a predetermined pattern may be identified based on data from EDA tools, DBB, which may be performed as described herein, and other knowledge. For example, in one such embodiment, a pattern that is more sensitive to process variations than another pattern may be determined based on experimental results (e.g., inspection results, defect review results, metrology results, failure analysis results, etc. generated for wafers containing the pattern). In another such embodiment, a pattern that is more sensitive to process variations than other patterns on the wafer may be determined based on empirical data (e.g., information about one or more attributes of the patterns formed on the wafer such as dimension, spacing, pattern density, etc.). Such empirical data may be acquired in any manner known in the art (e.g., from design data for the wafer). In this manner, in some embodiments, the method includes identifying the predetermined pattern using design data for the wafer.

In another embodiment, the method includes identifying the predetermined pattern by binning defects detected on the wafer in groups such that portions of design data proximate positions of the defects in each of the groups are at least similar. In this manner, the method may include binning the defects based on the design data proximate the positions of the defects, which may be referred to as DBB. As such, different groups of defects may be located in different portions of the design data and therefore proximate different patterns in the design data. Therefore, one or more attributes of the groups of defects (e.g., number of defects included in each of the groups) may be used to determine patterns that are more susceptible to defects or that exhibit higher defectivity. A pattern that is more susceptible to defects or that exhibits higher defectivity may be selected as the predetermined pattern. Such patterns may, therefore, be more relevant to the yield of the manufacturing process. In this manner, the embodiments described herein may be used for application of design-aware inspection results to identify weak patterns and to provide dynamic CD sampling for such patterns. As such, generating metrology sampling plans as described herein for such patterns may be particularly advantageous since process excursions occurring in these yield relevant patterns are more likely to be detected by metrology performed using such sampling plans compared to sampling plans that are fixed regardless of the inspection results. Binning the defects as described above may be performed as described in detail in the patent applications by Kulkarni et al. and Zafar et al., which are incorporated by reference above.

As described above, results of DBB may include groups of defects corresponding to different patterns on the wafer. Therefore, a population of defects located in a predetermined pattern may be determined based on results of DBB performed for the wafer for which a sampling plan is being generated. For example, a group of defects corresponding to a predetermined pattern as determined by DBB may be used as the population of defects for that predetermined pattern.

In another embodiment the method includes identifying the population of defects by overlaying results of inspection of the wafer with locations of the predetermined pattern on the wafer. The results of inspection of the wafer may be acquired using any suitable inspection process and any suitable inspection system such as those described herein. For example, the inspection results may be acquired using a BF inspection system, an electron beam based inspection system, or any other suitable inspection system known in the art. In this manner, the results of the inspection that may be used by the embodiments described herein may be generated by various inspection technologies including BF, dark field (DF), and electron beam inspection technologies. The inspection results may also include any information generated during inspection of the wafer or by an inspection system used to inspect the wafer. For example, the inspection results may include defect locations reported by the inspection system, defect sizes reported by the inspection system, images of the defects such as patch images generated by the inspection system, or any other output generated by the inspection system.

Overlaying the results of the inspection of the wafer with locations of the predetermined pattern on the wafer may be performed in any suitable manner. For example, the method may include overlaying inspection results to POI templates. In one such example, the locations of the predetermined pattern on the wafer may be determined based on information about the location(s) of the predetermined pattern within the dies formed on the wafer, information about the locations of the dies formed on the wafer, etc. Therefore, the locations of the predetermined pattern on the wafer may be overlaid with results of the inspection such as a map of the wafer or a die on the wafer that illustrates positions of the defects on the wafer or in the die. In this manner, defects that are located within the predetermined pattern can be identified using the map on which the locations of the predetermined pattern are overlaid.

FIG. 1 illustrates one example of results of inspection of a wafer that may be used by embodiments described herein. In particular, the results of the inspection shown in FIG. 1 include wafer map 10. Wafer map 10 includes rectangles 12 corresponding to the dies on the wafer. In particular, each of the rectangles in the wafer map indicates a die formed on the wafer. Therefore, although a particular number of rectangles is shown in FIG. 1 in one particular arrangement, it is to be understood that the number and arrangement of the rectangles on the wafer map will vary depending on the design for the wafer and the layout of the dies on the wafer. In addition, wafer map 10 includes symbols 14, each of which indicates the position of a defect detected on the wafer. Although a particular number of symbols is shown in FIG. 1 in one particular arrangement, it is to be understood that the number and arrangement of the symbols on the wafer map will vary depending on the inspection results for the wafer (e.g., the defects detected by inspection). If such a wafer map is included in the results of the inspection of the wafer or generated by the embodiments described herein, the locations of the predetermined pattern on the wafer may be overlaid on wafer map 10, and defects that are located within the predetermined pattern or that have locations that at least partially overlap with the locations of the predetermined pattern can be identified in the map.

Figure 2:
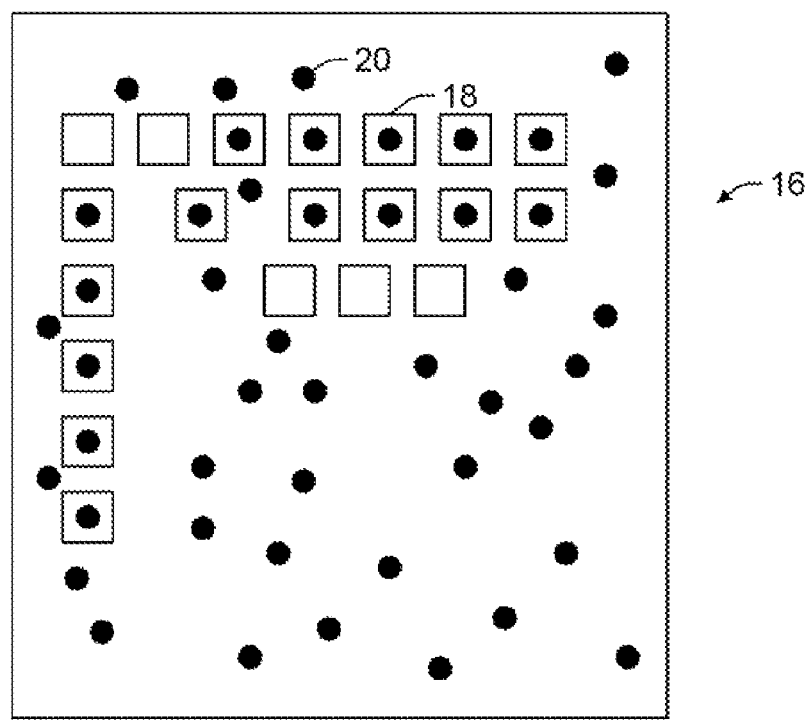
FIG. 2 is a schematic diagram illustrating one example of results of one embodiment of overlaying results of inspection of a wafer with locations of a predetermined pattern on the wafer.

FIG. 2 illustrates one example of results of one embodiment of overlaying results of inspection of a wafer with locations of a predetermined pattern on the wafer. In particular, FIG. 2 illustrates map 16 of one die formed on a wafer. The map of the die may be included in and extracted from a wafer map such as that shown in FIG. 1. Map 16 includes rectangles 18 corresponding to the predetermined pattern within the die. In particular, each of the rectangles in map 16 corresponds to one instance of the predetermined pattern formed in the die. Therefore, although a particular number of rectangles are shown in FIG. 2 in one particular arrangement, it is to be understood that the number and arrangement of the rectangles within the die will vary depending on the design for the wafer. In addition, each of the rectangles shown in the map corresponds to one instance of the same predetermined pattern. However, the map may illustrate rectangles corresponding to different predetermined patterns, which may be indicated in different manners (e.g., by different colors, different characteristics of the lines corresponding to the boundaries of the different predetermined patterns, etc.). In addition, more than one map may be generated, each of which may show rectangles or other indicia corresponding to one of the different predetermined patterns within the die.

Map 16 also includes symbols 20, each of which indicates the position of a defect detected in the die. Although a particular number of symbols is shown in FIG. 2 in one particular arrangement, it is to be understood that the number and arrangement of the symbols within the map will vary depending on the results of the inspection (e.g., the defects detected by inspection). Therefore, map 16 illustrates the locations of the predetermined pattern within the die overlaid with the locations of the defects detected in the die. As such, defects that are located within the predetermined pattern or that have locations that at least partially overlap the locations of the predetermined pattern can be identified in the map as those defects corresponding to the symbols that are located at least partially within one of the rectangles. In particular, the symbols that are located within the rectangles correspond to defects that are located at least partially within the predetermined pattern. Therefore, the population of defects may be identified as those defects corresponding to symbols located at least partially in the rectangles. The defects that are located within the predetermined pattern or that have locations that at least partially overlap the locations of the predetermined pattern can be identified in a similar manner using the wafer map shown in FIG. 1.

In another embodiment, the method includes identifying the population of defects by comparing locations of defects detected on the wafer to locations of the predetermined pattern on the wafer. For example, the locations of the defects detected on the wafer may be reported by an inspection system and included in the results of the inspection. In addition, the locations of the predetermined pattern on the wafer may be determined as described above. Therefore, the locations of the defects on the wafer and the locations of the predetermined pattern on the wafer may be compared (e.g., by comparing the x and y coordinates for the defects to the x and y coordinates for the predetermined pattern), which may be performed in any suitable manner, and any defects that are located within the location of the predetermined pattern on the wafer may be identified and included in the population of defects.

In an additional embodiment, the method includes identifying the population of defects by comparing patterns proximate defects detected on the wafer to one or more patterns stored in a data structure. In this manner, the embodiments described herein may identify the population of defects using pattern based matching. For example, a pattern library may be created and patterns in the library may be matched to defect inspection results. For defects that are part of the library, the method may include collecting inspection attributes and identifying outliers as described further herein (e.g., for populations of defects identified by location). The patterns that are matched in order to identify the population of defects may include a portion of the pattern printed on the wafer and/or a portion of design data proximate positions of the defects in design data space. Such pattern based matching using a pattern library may be further performed as described in the above-referenced patent applications by Kulkarni et al. and Zafar et al.

The results of the inspection of the wafer may include one or more attributes of the individual defects. In this manner, the one or more attributes of the defects may be provided by the defect inspection system. The one or more attributes of the defects may include, for example, dimension in the x direction (e.g., width), dimension in the y direction (e.g., length), dimension in the z direction (e.g., height), shape, brightness, contrast, polarity, texture, one or more attributes of the results of the inspection in which the defects were detected, one or more parameters of the inspection in which the defects were detected, or some combination thereof. However, in some embodiments, the method includes determining the one or more attributes of the individual defects based on results of inspection of the wafer. For example, the method may include determining one or more of the attributes described above based on the results of the inspection of the wafer (e.g., using images of the defects generated by inspection). In addition, some attributes of the defects may be determined by the inspection system and included in the inspection results, while other or additional attributes of the defects may be determined by the embodiments described herein using the attributes determined and reported by the inspection system and/or any other output of the inspection system. The one or more attributes of the defects may be determined in any other suitable manner.

In another embodiment, the method includes determining the one or more attributes of the population of defects based on the one or more attributes of the individual defects included in the population of defects. The one or more attributes of the population of defects may include any suitable attribute(s) of the population of defects. For example, if one attribute of the individual defects that is reported or determined as described above is contrast, the attribute of the population of defects may be the mean, median, average, etc. of the contrast of all of the defects included in the population of defects. In this manner, the one or more attributes of the population of defects may include some characteristic (e.g., mean, median, average, etc.) of the one or more attributes of the individual defects included in the population. The one or more attributes of the population of defects may be determined in any suitable manner.

As described above, the method includes identifying one or more individual defects that have one or more attributes that are abnormal from one or more attributes of a population of defects in which the individual defects are included. In this manner, the method may include identifying defects (among the defects located in a template for the predetermined pattern), which have inspection attributes that are abnormal from the corresponding parent population.

In some embodiments, identifying the one or more individual defects that have one or more attributes that are abnormal includes statistical analysis of the one or more attributes of the population of defects. For example, by performing a descriptive statistical analysis among the detected population of defects for a predetermined pattern using inspection attributes (e.g., size, contrast, polarity, etc.), atypical patterns can be identified for metrology such as CD measurement. In this manner, the embodiments described herein may use a statistical approach to analyze inspection attributes to identify abnormal sites on the wafer, which can be used to determine sampling sites (e.g., sites at which CD measurements should be performed) as described further herein.

Figure 3:
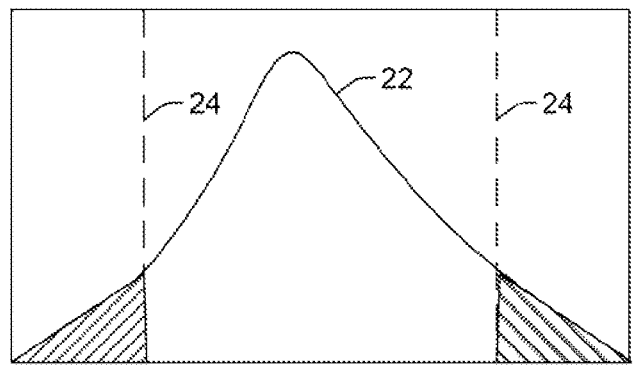
FIG. 3 is a schematic diagram illustrating one example of results of one embodiment of statistical analysis of one or more attributes of a population of defects.

FIG. 3 illustrates one example of results of one embodiment of statistical analysis of one or more attributes of a population of defects. In particular, FIG. 3 illustrates histogram 22 for one attribute of a population of defects. The histogram for the attribute may be determined based on the attributes of the individual defects included in the population. Such a histogram may be determined for any of the attributes described herein. In addition, the histogram may be generated based on one or more attributes or a combination of attributes of the population of defects. Histogram 22 illustrates the distribution of one attribute of the defects included in the population. For example, the value of the attribute for the individual defects may be plotted along the x axis, and the number of defects having different values of the attribute may be plotted on the y axis. In this manner, the most frequently recorded or determined values of the attribute appear near the center of the distribution for the population, while less frequently recorded or determined values of the attribute appear at both ends of the distribution for the population. In other words, as shown by the shape of the distribution, most defects have values of the attribute near the center of the distribution of the values of the attribute while fewer defects have values of the attribute near the edges of the distribution. Therefore, the defects that have values of the attribute near the edges of the distribution may be identified as having abnormal values of the attribute and therefore may be determined to be the outliers of the population.

The values of the attribute that are considered to be near the edges of the distribution may be determined statistically. For example, the mean and standard deviation of the distribution of the values of the attribute may be determined for the population of defects, and thresholds 24 shown in FIG. 3 may correspond to the values of the attribute that are two standard deviations from the mean. Therefore, in this example, defects that have values of the attribute that are between thresholds 24 may be determined to have attributes that are normal, while defects that have values of the attribute that are not between the thresholds may be determined to have attributes that are abnormal from the attribute of the population. As such, locations of defects on the wafer that have values of the attribute that are not between the thresholds may be identified by the embodiments described herein as areas on the wafer that may be sampled during metrology.

Figure 4:
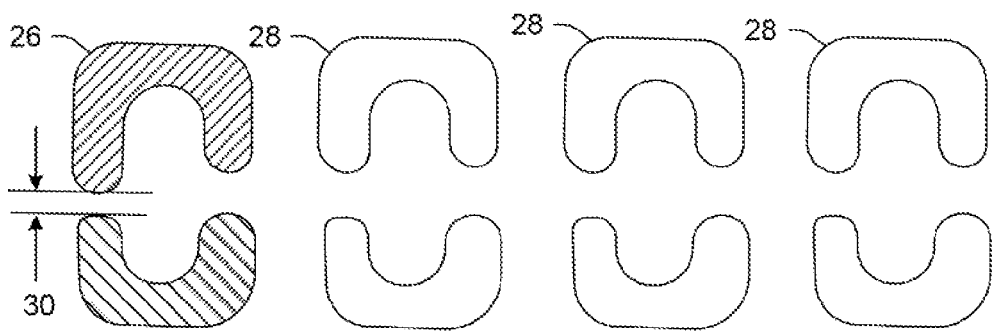
FIG. 4 is a schematic diagram illustrating a plan view of one example of an individual defect, which is included in a population of defects located in a predetermined pattern on a wafer and has one or more attributes that are abnormal from one or more attributes of the population of defects, and individual defects included in the population that do not have one or more attributes that are abnormal from the one or more attributes of the population of defects.

FIG. 4 illustrates one example of different defects that have values of an attribute that are normal and one example of a defect that has a value of the attribute that is abnormal from the attribute of the population of the defects in which these defects are included. In particular, individual defect 26, included in a population of defects located in a predetermined pattern on a wafer, has one or more attributes that are abnormal from one or more attributes of the population of defects. For example, defect 26 may have a value of the attribute that is outside of thresholds 24 shown in FIG. 3. In contrast, individual defects 28 shown in FIG. 4 included in the same population as defect 26 may have one or more attributes that are not abnormal from the one or more attributes of the population of defects. For example, defects 28 may have values of the attribute that are inside of thresholds 24 shown in FIG. 3. Therefore, defect 26 may be identified by the embodiments described herein such that an area on the wafer in which defect 26 is located is sampled during metrology, while areas on the wafer in which defects 28 are located are not sampled during metrology. In one such example, CD 30 shown in FIG. 4 of defect 26 may be measured during metrology. As shown in FIG. 4, CD 30 may be the space between two line ends of the pattern. However, any other CD of defect 26 or any other measurement may be performed on defect 26 during metrology.

In another embodiment, identifying the one or more individual defects that have one or more attributes that are abnormal includes statistical analysis of images of the individual defects. For example, statistical analysis may be performed on patch images (or scanning electron microscope (SEM) images) of the defects that fall into the POI template. The input parameters for the statistical analysis may include various defect attributes such as brightness, contrast, size, etc., which may be provided by the defect inspection system or determined by the embodiments as described further herein. The statistical analysis of the images may be performed as described further herein.

Statistical analysis may be one attractive approach for identifying abnormal sites on the wafer. However, the abnormal sites may be identified in any other suitable manner. For example, results of inspection of the wafer (e.g., inspection results for the defects detected on the wafer) may be used to compare attributes of the detected defects and to separate the defects based on subtle differences between the attributes. In another example, patch images (or SEM images) for defects included in a population of defects detected in a predetermined pattern may be compared to identify abnormal or outlier patterns or defects. Comparing the images may include comparing any of the attributes described herein such as color, brightness, etc. to identify abnormal defects or outliers. In an additional example, one or more thresholds may be applied to the attributes of the detected defects to separate the defects based on subtle differences between the attributes. The one or more thresholds may be determined dynamically (e.g., based on the inspection results for the wafer for which the metrology sampling plan is being generated) or prior to the inspection (e.g., based on attributes of defects detected on other wafers).

In one embodiment, the one or more identified individual defects include fewer than all of the individual defects included in the population of defects. For example, a statistical approach such as one of those described herein can be used to identify abnormal sites on the wafer thereby performing data reduction for generating the final sampling plan, which may be performed as described further herein. In particular, the data may be first reduced by identifying the population of defects, which includes only the defects located in a predetermined pattern on the wafer. In this manner, the population of defects may include only a subset or only some of all of the defects detected on the wafer. However, the number of defects that is detected and located in the predetermined pattern may be large enough to make metrology sampling of all of the defects in the predetermined pattern prohibitive with respect to both time and cost. Therefore, fewer than all of the defects in the predetermined pattern may be sampled. However, unlike previously used metrology sampling plans that were static regardless of the defects detected on the wafer, the embodiments described herein can be used to identify potential CD failure sites based on inspection results. In particular, as described further herein, the method may include using POI location overlay with inspection results (e.g., defect data) to reduce sampling sites (e.g., CD sampling sites) to only the sites of defects located in the POI, which can be further reduced to only the sites of defects located in the POI that have one or more abnormal attributes. In this manner, the sampling sites can be reduced first by design and then by abnormality. Therefore, the embodiments described herein can be used to dynamically sample areas on the wafer that exhibit one or more abnormal attributes such that the sites that exhibit the largest variations can be sampled during metrology thereby providing important information regarding the changes that are occurring in a particular pattern on the wafer.

In some embodiments, the results of identifying the one or more individual defects that have one or more attributes that are abnormal include the one or more individual defects located in the one or more areas on the wafer at which the predetermined pattern is more sensitive to process variations than other areas on the wafer at which the predetermined pattern is formed. For example, the defects that have one or more attributes that are abnormal from the one or more attributes of the population of defects may be more sensitive to process variations than defects that occur at other areas on the wafer in the same predetermined pattern. In this manner, the embodiments described herein advantageously identify defects for sampling based on attributes of the defects and the population of defects such that defects that are abnormal and therefore potentially more sensitive to subtle changes in the pattern and process variations are sampled. As such, the embodiments described herein can perform data reduction while selecting sites for metrology sampling that can yield information that is most relevant to detecting changes in the wafer and the process.

The method also includes generating the metrology sampling plan based on results of identifying the one or more individual defects that have one or more attributes that are abnormal such that one or more areas on the wafer in which the one or more identified individual defects are located are sampled during metrology. In this manner, the method includes generating a sampling plan for the areas on the wafer that are determined to be atypical. In addition, the method includes generating a metrology sampling procedure that takes into account defect inspection data that shows abnormality among various sites and design context. For example, as described further herein, inspection data such as BF inspection data can be used to identify abnormal (or outlier) sites on the wafer, and the metrology sampling plan can be generated such that measurements such as CD measurements are performed at these abnormal sites during metrology. In this manner, a CD sampling plan may be generated for sampling of the outliers.

The metrology sampling plan may be generated in any suitable format (such as a file format that can be used by a metrology system). In addition, the metrology sampling plan may be generated by creating a new metrology sampling plan that includes the one or more areas on the wafer in which the one or more identified individual defects are located as the areas to be sampled or altering an existing metrology sampling plan by changing the samples areas in the existing plan to the one or more areas on the wafer in which the one or more identified individual defects are located.

In one embodiment, the method includes performing the method separately for different predetermined patterns on the wafer such that different metrology sampling plans are generated for the different predetermined patterns. For example, different metrology sampling plans may be generated for two or more different predetermined patterns as described herein in the same method (e.g., simultaneously and separately). Therefore, the sampling plan for each of the different predetermined patterns (e.g., some or all of the different patterns formed on the wafer) may be determined based on the abnormal defects or outliers located only in the corresponding predetermined patterns. As such, the sampling plan generated for each of the predetermined patterns may be particularly sensitive to the different abnormal defects or outliers that occur in only the corresponding pattern. As a result, the sampling plans generated as described herein may be particularly sensitive to different process variations that are causing different defects in different predetermined patterns thereby simultaneously enhancing the metrology for different predetermined patterns.

Sampling plans for different predetermined patterns (or any single predetermined pattern) may also be generated based on the priority of the different predetermined patterns. For example, the priority assigned to different predetermined patterns may be based on the criticality of the predetermined patterns as well as other characteristics of the predetermined patterns (e.g., yield relevance). The priority of different predetermined patterns may be determined and assigned as described in the patent applications by Kulkarni et al. and Zafar et al., which are incorporated by reference above. Therefore, a sampling plan for a predetermined pattern that has a higher priority may include more sampling sites than a sampling plan for a predetermined pattern that has a lower priority. In this manner, different predetermined patterns on a single wafer can be sampled more or less heavily based on the priority assigned to the predetermined patterns. As such, more or less information can be acquired for the different predetermined patterns based on the priority assigned to the patterns such that more information is acquired during metrology for the higher priority predetermined patterns than the lower priority predetermined patterns. As a result, the metrology sampling plans generated as described herein may be used to acquire metrology results that are particularly relevant to yield thereby increasing the value of the metrology results while possibly also decreasing the time and cost involved in acquiring the metrology results.

In another embodiment, generating the metrology sampling plan is performed dynamically. For example, the embodiments described herein can use defect inspection data to create dynamic sampling (e.g., for CD measurements). In particular, since the metrology sampling plans are generated as described herein based on results of inspection of the wafer (e.g., based on information about the defects located in predetermined patterns formed on the wafer), a metrology sampling plan can be generated for each wafer for which inspection results have been generated. In some embodiments, therefore, generating the metrology sampling plan is performed on a wafer-to-wafer basis. As such, the metrology sampling plans can be generated as described herein dynamically such that measurements can be performed at dynamically determined sampling locations instead of the fixed locations at which CD measurements are performed based on currently used metrology sampling plans.

In addition, as described herein, the areas on the wafer that are selected for sampling by metrology may include locations at which defects that are abnormal and therefore more sensitive to process variations are located. However, such locations on the wafer may change over time and as the process variations change. For example, depending upon the amount of process variation (e.g., regional focus and exposure, film thickness variation, material composition, etc.), certain locations within wafer or die may exhibit different degrees of variation. However, typical CD measurements are performed based on pre-defined sampling plans and locations. Therefore, depending upon process variations and sensitivity of the CD sites, the fixed locations may not reflect the subtle changes in CD that may occur in advanced process. In contrast, the metrology sampling plans generated as described herein in which locations that are sensitive to process variations are selected for sampling dynamically increase, and may even optimize, the chance of identifying subtle variations, which will result in fewer excursions that are missed by metrology compared to fixed metrology sampling plans.

In one embodiment, the metrology includes CD metrology. However, the metrology may include any suitable metrology process, which may include performing any suitable measurements using any suitable metrology system. For example, the metrology process may include measuring CD using a scatterometry system. In another example, the metrology process may include measuring roughness using an atomic force microscope (AFM). In yet another example, the metrology process may include measuring profile of the defects using a scanning electron microscope (SEM). In addition, the metrology may include performing one or more different measurements of the defects using one or more measurement techniques. The methods described herein also may or may not include performing metrology of the wafer using the metrology sampling plan generated as described herein. For example, the metrology sampling plan may be used by the embodiments described herein or another system or method to perform metrology of the wafer.

All of the methods described herein may include storing results of one or more steps of the method embodiments in a storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. For example, after the method generates the metrology sampling plan, the method may include storing the metrology sampling plan in a metrology recipe in a storage medium. In addition, results or output of the embodiments described herein may be stored and accessed by a metrology system such as a CD SEM such that the metrology system can use the metrology sampling plan for metrology assuming that the output file can be understood by the metrology system. Furthermore, the results may be stored "permanently," "semi-permanently," temporarily, or for some period of time. For example, the storage medium may be random access memory (RAM), and the results may not necessarily persist indefinitely in the storage medium.

Each of the embodiments of the method described above may include any other step(s) of any other method(s) described herein. In addition, each of the embodiments of the method described above may be performed by any of the systems described herein.

The metrology sampling plans generated by the embodiments described herein provide a number of advantages over other metrology sampling plans such as fixed sampling plans. For instance, the metrology sampling plans generated as described herein will result in much improved selection of metrology sites (e.g., CD sites) that would signal subtle changes (e.g., in CD) for better detection of variations (e.g., CD variations). The metrology sampling plans generated as described herein would also increase the chance of detecting variations (e.g., CD variations) that traditional approaches may miss.

Figure 5:
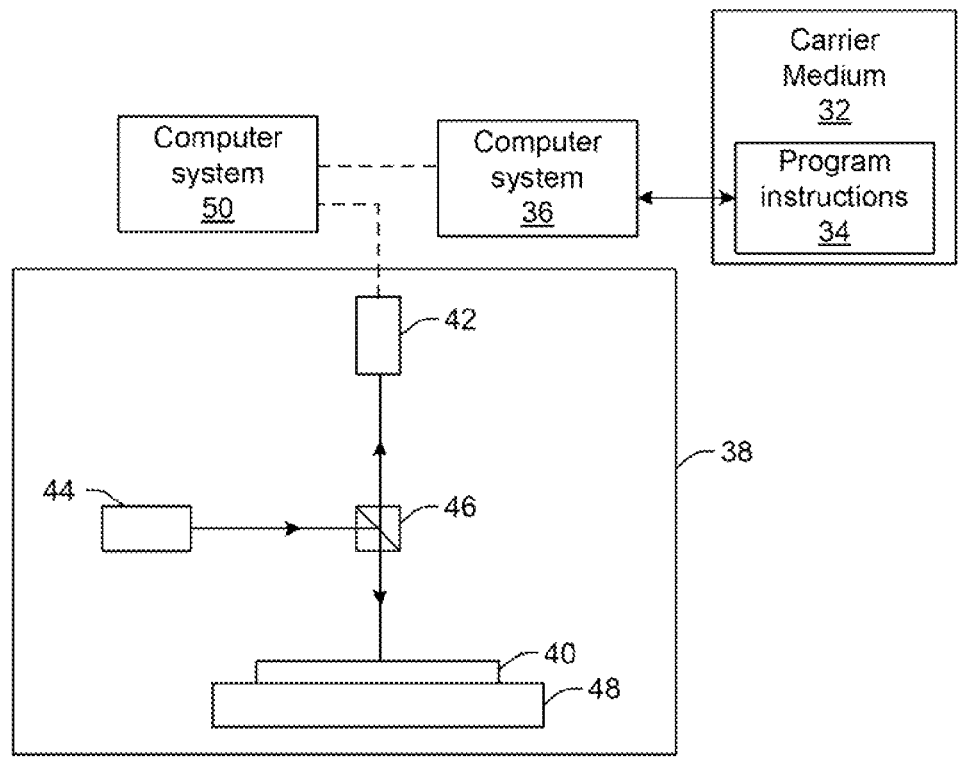
FIG. 5 is a schematic diagram illustrating a side view of one embodiment of a carrier medium that includes program instructions executable on a computer system for performing one or more embodiments of a computer-implemented method described herein and one embodiment of a system configured to generate a metrology sampling plan.

Another embodiment relates to a carrier medium that includes program instructions executable on a computer system for performing a computer-implemented method for generating a metrology sampling plan. One embodiment of such a carrier medium is shown in FIG. 5. In particular, carrier medium 32 includes program instructions 34 executable on computer system 36 for performing a computer-implemented method.

The computer-implemented method includes identifying one or more individual defects that have one or more attributes that are abnormal from one or more attributes of a population of defects in which the individual defects are included. The population of defects is located in a predetermined pattern on a wafer. Identifying the one or more individual defects may be performed according to any of the embodiments described herein. The computer-implemented method also includes generating the metrology sampling plan based on results of the identifying step such that one or more areas on the wafer in which the one or more identified individual defects are located are sampled during metrology. Generating the metrology sampling plan may be performed according to any of the embodiments described herein.

The computer-implemented method executable on the computer system by the program instructions may include any other step(s) of any other method(s) described herein. In addition, the carrier medium may be further configured as described herein.

Program instructions 34 implementing methods such as those described herein may be transmitted over or stored on carrier medium 32. The carrier medium may be a transmission medium such as a wire, cable, or wireless transmission link. The carrier medium may also be a storage medium such as a read-only memory, a random access memory, a magnetic or optical disk, or a magnetic tape.

Computer system 36 may take various forms, including a personal computer system, mainframe computer system, workstation, image computer, parallel processor, or any other device known in the art In general, the term "computer system" may be broadly defined to encompass any device having one or more processors, which executes instructions from a memory medium.

An additional embodiment relates to a system configured to generate a metrology sampling plan. The system includes an inspection system configured to detect defects on a wafer. One embodiment of such a system is shown in FIG. 5. For example, as shown in FIG. 5, the system includes inspection system 38. Inspection system 38 is configured to detect defects on wafer 40.

In one embodiment, inspection system 38 includes light source 44. Light source 44 may include any appropriate light source known in the art. Light source 44 may be configured to direct light to beam splitter 46. Beam splitter 46 may be configured to direct light from light source 44 to wafer 40 at a substantially normal angle of incidence. Beam splitter 46 may include any appropriate optical component known in the art.

Light reflected from wafer 40 may pass through beam splitter 46 to detector 42. Detector 42 may include any appropriate detector known in the art. Output generated by detector 42 may be used to detect defects on wafer 40. For example, computer system 50 may be configured to detect defects on wafer 40 using output generated by the detector. The computer system may use any method and/or algorithm known in the art to detect defects on the wafer. The computer system may be coupled to the detector in any suitable manner (e.g., by one or more transmission media indicated by the dotted line shown in FIG. 5, which may include any suitable transmission media known in the art) such that the computer system can receive the output generated by the detector. Furthermore, if the inspection system includes more than one detector (not shown), the computer system may be coupled to each detector as described above. Computer system 50 may be further configured as described herein. During inspection, wafer 40 may be disposed on stage 48. Stage 48 may include any appropriate mechanical and/or robotic assembly known in the art. The inspection system shown in FIG. 5 may also include any other suitable components (not shown) known in the art.

As shown in FIG. 5, the inspection system is configured to detect light specularly reflected from the wafer. In this manner, the inspection system shown in FIG. 5 is configured as a BF inspection system. However, the inspection system may be replaced by an inspection system configured as a DF inspection system, an edge contrast (EC) inspection system, an aperture mode inspection system, or any other optical inspection system known in the art. In addition, the inspection system may be configured to perform one or more inspection modes. For example, the inspection system shown in FIG. 5 may be configured to perform DF inspection by altering an angle of incidence at which the light is directed to the wafer and/or an angle at which light is collected from the wafer. In another example, the inspection system may be configured such that one or more optical components (not shown) such as apertures may be positioned in the illumination path and the collection path such that the inspection system can perform EC mode inspection and/or an aperture mode of inspection. Furthermore, the wafer inspection system described above may be replaced by a reticle inspection system, which may include any suitable reticle inspection system known in the art.

It is noted that FIG. 5 is provided herein to generally illustrate one configuration of an inspection system that may be included in the system embodiments described herein. Obviously, the inspection system configuration described herein may be altered to optimize the performance of the inspection system as is normally performed when designing a commercial inspection system. In addition, the systems described herein may be implemented using an existing inspection system (e.g., by adding functionality described herein to an existing inspection system) such as the Puma 9000. and 9100. series of tools that are commercially available from KLA-Tencor, San Jose, Calif. For some such systems, the methods described herein may be provided as optional functionality of the system (e.g., in addition to other functionality of the system). Alternatively, the system described herein may be designed "from scratch" to provide a completely new system.

In another embodiment, the optical inspection system shown in FIG. 5 may be replaced by an electron beam inspection system. Examples of commercially available electron beam inspection systems that may be included in the system of FIG. 5 include the eS25, eS30, and eS31. systems from KLA-Tencor.

The system also includes computer system 36 configured to identify one or more individual defects that have one or more attributes that are abnormal from one or more attributes of a population of defects in which the individual defects are included. The population of defects is located in a predetermined pattern on the wafer. The computer system may be configured to identify the one or more individual defects according to any of the embodiments described herein. Computer system 36 is also configured to generate the metrology sampling plan based on the one or more identified individual defects such that one or more areas on the wafer in which the one or more identified individual defects are located are sampled during metrology. The computer system may be configured to generate the metrology sampling plan according to any of the embodiments described herein. Computer system 36 may be configured to perform any other step(s) of any of the method embodiment(s) described herein.

In embodiments of the system that include the inspection system, computer system 36 may be coupled to the inspection system in any manner known in the art. For example, computer system 36 may be coupled to computer system 50 of inspection system 38 such that the computer system can receive results of inspection generated by computer system 50. In addition, computer system 36 may receive any other output of the detector or computer system 50 such as image data and signals.

Computer system 36 described above may be configured as a stand-alone system that does not form part of a process, inspection, metrology, review, or other tool. In such an embodiment, computer system 36 may be configured to receive and/or acquire data or information from other systems (e.g., inspection results from an inspection system) by a transmission medium that may include "wired" and/or "wireless" portions. In this manner, the transmission medium may serve as a data link between the computer system and the other system. In addition, computer system 36 may send data to another system via the transmission medium. Such data may include, for example, a metrology sampling plan generated by the computer system.

Alternatively, computer system 36 may form part of the inspection system, metrology system, or other tool. For example, computer system 36 may be included in a metrology system. Therefore, the metrology system may be coupled to the inspection system by its computer system, and the computer system of the metrology system may be configured to generate the metrology sampling plan as described herein. In one such embodiment, the inspection system may include a BF inspection system such as those described herein, and the metrology system may include a defect review SEM that has CD measurement capability. In another example, computer system 50 may be configured as described above with respect to computer system 36. In this manner, the computer system included in the inspection system may be configured to identify the one or more individual defects as described above and to generate the metrology sampling plan as described above. In such embodiments, computer system 36 may or may not be included in the system.

The embodiments of the system shown in FIG. 5 may be further configured as described herein. In addition, the system may be configured to perform any other step(s) of any of the method embodiment(s) described herein.

Further modifications and alternative embodiments of various aspects of the invention may be apparent to those skilled in the art in view of this description. For example, computer-implemented methods, carrier media, and systems for generating a metrology sampling plan are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A computer-implemented method for generating a metrology sampling plan, comprising:
   using a computer system to perform stems of:
   identifying one or more individual defects that have one or more attributes that are abdominal from one or more attributes of a population of defects in which the individual defects are included, wherein the population of defects is located in a predetermined pattern on a wafer; and
   generating the metrology sampling plan based on results of said identifying such that one or more areas on the wafer in which the one or more identified individual defects are located are sampled during metrology.

2. The method of claim 1, further comprising determining the one or more attributes of the individual defects based on results of inspection of the wafer.

3. The method of claim 1, further comprising determining the one or more attributes of the population of defects based on the one or more attributes of the individual defects included in the population of defects.

4. The method of claim 1, wherein the predetermined pattern in which the population of defects is located is formed at multiple locations on the wafer.

5. The method of claim 1, wherein the predetermined pattern comprises only a portion of an entire design patterned on the wafer.

6. The method of claim 1, wherein the predetermined pattern comprises a pattern of interest.

7. The method of claim 1, wherein the predetermined pattern comprises a pattern that is more sensitive to process variations than another pattern on the wafer.

8. The method of claim 1, further comprising identifying the predetermined pattern using design data for the wafer.

9. The method of claim 1, further comprising identifying the predetermined pattern by binning defects detected on the wafer in groups such that portions of design data proximate positions of the defects in each of the groups are at least similar.

10. The method of claim 1, further comprising identifying the population of defects by overlaying results of inspection of the wafer with locations of the predetermined pattern on the wafer.

11. The method of claim 1, further comprising identifying the population of defects by comparing locations of defects detected on the wafer to locations of the predetermined pattern on the wafer.

12. The method of claim 1, further comprising identifying the population of defects by comparing patterns proximate defects detected on the wafer to one or more patterns stored in a data structure.

13. The method of claim 1, wherein said identifying comprises statistical analysis of the one or more attributes of the population of defects.

14. The method of claim 1, wherein said identifying comprises statistical analysis of images of the individual defects.

15. The method of claim 1, wherein the one or more identified individual defects comprise fewer than all of the individual defects included in the population of defects.

16. The method of claim , wherein the results of said identifying comprise the one or more individual defects located in the one or more areas on the wafer at which the predetermined pattern is more sensitive to process variations than other areas on the wafer at which the predetermined pattern is formed.

17. The method of claim 1, further comprising performing the method separately for different predetermined patterns on the wafer such that different metrology sampling plans are generated for the different predetermined patterns.

18. The method of claim 1, wherein generating the metrology sampling plan is performed dynamically.

19. The method of claim 1, wherein generating the metrology sampling plan is performed on a wafer-to-wafer basis.

20. The method of claim 1, wherein the defects comprise pattern defects.

21. The method of claim 1, wherein the metrology comprises critical dimension metrology.

22. A system configured to generate a metrology sampling plan, comprising:
   an inspection system configured to detect defects on a wafer; and
   a computer system configured to:
   identify one or more individual defects that have one or more attributes that are abnormal from one or more attributes of a population of defects in which the individual defects are included, wherein the population of defects is located in a predetermined pattern on the wafer; and
   generate the metrology sampling plan based on the one or more identified individual defects such that one or more areas on the wafer in which the one or more identified individual defects are located are sampled during metrology.

* * * * *